United States Patent
Rykowski et al.

(10) Patent No.: US 11,930,426 B2
(45) Date of Patent: *Mar. 12, 2024

(54) PROVIDING ACCESS TO APPLICATIONS WITH VARYING ENROLLMENT LEVELS

(71) Applicant: AirWatch LLC, Atlanta, GA (US)

(72) Inventors: Adam Stephen Rykowski, Atlanta, GA (US); Ashish Jain, Los Altos, CA (US); Dale Robert Olds, Redwood City, CA (US); Emily Hong Xu, Palo Alto, CA (US); Kabir Barday, Atlanta, GA (US); Kyle Austin, Saratoga, CA (US); Sridhara Babu Kommireddy, Alpharetta, GA (US); Pratik Jagad, Marietta, GA (US); Krishna Kumar Bhavesh, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/133,751

(22) Filed: Dec. 24, 2020

(65) Prior Publication Data
US 2021/0120380 A1 Apr. 22, 2021

Related U.S. Application Data

(63) Continuation of application No. 15/953,781, filed on Apr. 16, 2018, now Pat. No. 10,887,733, which is a
(Continued)

(51) Int. Cl.
*H04L 9/40* (2022.01)
*H04L 67/00* (2022.01)
(Continued)

(52) U.S. Cl.
CPC ............ *H04W 4/14* (2013.01); *H04L 63/105* (2013.01); *H04L 67/34* (2013.01); *H04W 4/50* (2018.02); *H04L 2463/082* (2013.01)

(58) Field of Classification Search
CPC ........ H04W 4/14; H04W 4/50; H04L 63/105; H04L 67/34; H04L 2463/082
See application file for complete search history.

(56) References Cited

U.S. PATENT DOCUMENTS 7,503,063 B1  3/2009  Mishra et al.
8,613,055 B1 * 12/2013  Tomilson ................ G06F 21/00
                                                      726/20

(Continued)

*Primary Examiner* — Joseph E Dean, Jr.
(74) *Attorney, Agent, or Firm* — King Intellectual Asset Management

(57) ABSTRACT

Examples of detecting whether a device meets an enrollment level are disclosed. In one case, a method for providing access to an application on a client device includes receiving a request to access an application from the client device, determining an enrollment level associated with the application, and determining that multi-factor authentication is required for access to the application on the client device based on the enrollment level associated with the application. The method can also include initiating multi-factor authentication on the client device before access to the application is permitted. The method can also include determining that multi-factor authentication is successful on the client device, transmitting a management component to the client device, and installing the management component on the client device for enrollment as a managed device with a management service.

17 Claims, 9 Drawing Sheets

Related U.S. Application Data continuation of application No. 14/839,287, filed on Aug. 28, 2015, now Pat. No. 10,021,542.

(51) Int. Cl.
*H04W 4/14* (2009.01)
*H04W 4/50* (2018.01)

(56) References Cited

U.S. PATENT DOCUMENTS

| | | |
|---|---|---|
| 8,819,194 B2 | 8/2014 | Msalli et al. |
| 8,881,140 B1 | 11/2014 | Bringhurst |
| 9,294,468 B1 | 3/2016 | Kilbourn |
| 10,021,542 B2 | 7/2018 | Rykowski et al. |
| 10,887,733 B2 * | 1/2021 | Rykowski ............... H04L 67/34 |
| 2011/0010761 A1 | 1/2011 | Doyle |
| 2014/0032758 A1 * | 1/2014 | Barton ................... H04L 41/00 709/225 |
| 2014/0181959 A1 | 6/2014 | Li et al. |
| 2014/0297825 A1 * | 10/2014 | Lang ....................... G06F 9/468 709/223 |
| 2014/0298322 A1 | 10/2014 | Gargiulo et al. |
| 2015/0296368 A1 | 10/2015 | Kaufman et al. |
| 2017/0026383 A1 | 1/2017 | Hayton et al. |

* cited by examiner

PROVIDING ACCESS TO APPLICATIONS WITH VARYING ENROLLMENT LEVELS

CROSS-REFERENCE TO RELATED APPLICATIONS

This application is a continuation of U.S. patent application Ser. No. 15/953,781, filed Apr. 16, 2018, and entitled PROVIDING ACCESS TO APPLICATIONS WITH VARYING ENROLLMENT LEVELS, which is incorporated entirely herein by reference and is a continuation of U.S. patent application Ser. No. 14/839,287, filed Aug. 28, 2015, and entitled PROVIDING ACCESS TO APPLICATIONS WITH VARYING ENROLLMENT LEVELS, which is incorporated entirely herein by reference. This application is related to U.S. patent application Ser. No. 14/839,276, filed Aug. 28, 2015 and entitled PROVIDING ACCESS TO APPLICATIONS WITH VARYING ENROLLMENT LEVELS, which is incorporated entirely herein by reference.

BACKGROUND

Users in an enterprise setting are often assigned a mobile device or another type of computing device. In some situations, users can use their own devices in an enterprise setting to access enterprise data or applications. The enterprise can make applications available to users that are accessible in a browser upon authentication of the user's credentials. Other types of applications can be downloaded and installed on a user's device from a public or private application repository. The applications that are available to a user can be based upon the user's role or a group membership within the enterprise.

The enterprise can have information or data security policies that impose certain prerequisites in order for a user to access an application. For example, accessing a browser-based application can require authentication of a user's credentials. Downloading a binary application that is installed on the user's device can require that the user enroll the device with a volume licensing program or a private application repository if the application is embedded with certain management functionality or made using certain management application programming interfaces (APIs). In another scenario, downloading and installing some applications can require that the user's device be enrolled as a managed device with an enterprise mobility management (EMM) system. An EMM system can enforce compliance rules and policies that ensure that certain information and data security requirements are being met by the user's device.

Accordingly, because various types of prerequisites exist in order to access enterprise applications, users may not wish to enroll their devices as managed devices unless they are accessing an application that requires enrollment. Similarly, if a user is accessing an application that requires an additional level of control over the device, the user may wish to have information about why various enrollment levels are required in order to access different applications that are available to the user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to identifying an enrollment level that is linked with an application and facilitating enrollment of a client device when the application is accessed by a user of the client device. In the context of this disclosure, an enrollment level represents a degree of management over a client device that is required before the client device is granted access to a particular application. Certain applications, such as browser-based applications, do not require management of user's device through management application programming interfaces (APIs) or other management features of an operating system of the client device. Other applications, however, require varying levels of device management through operating system APIs or through installation of additional management software on the client device.

In some instances, in order to access an application made available by an enterprise, the enterprise can require that a client device be enrolled as a managed device with a management service. In other instances, an enterprise can make managed applications available to its users and require that a client device be enrolled with a volume licensing program associated with a public application repository in order to download and install the application. In another scenario, the enterprise can require the client device to enroll with a private application repository in order to access the managed application. In this sense, the enterprise can define varying enrollment levels that can be linked with applications associated with the enterprise. In order to access a particular application, a management service can determine whether the client device of the user meets an enrollment level required by the application before providing access to the application for the user.

Figure 1:
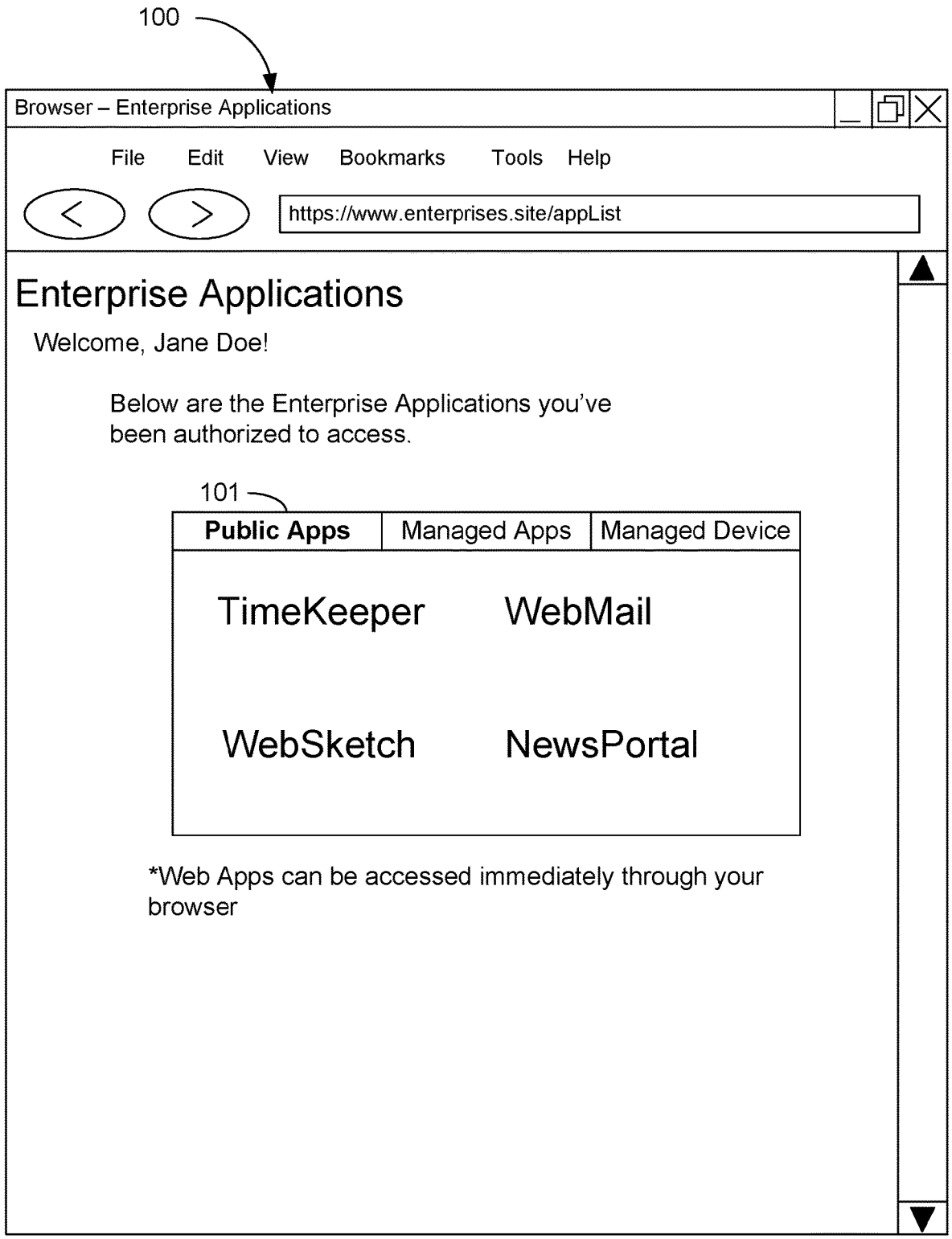
FIGS. 1-3 are drawings of example user interfaces.
Figure 2:
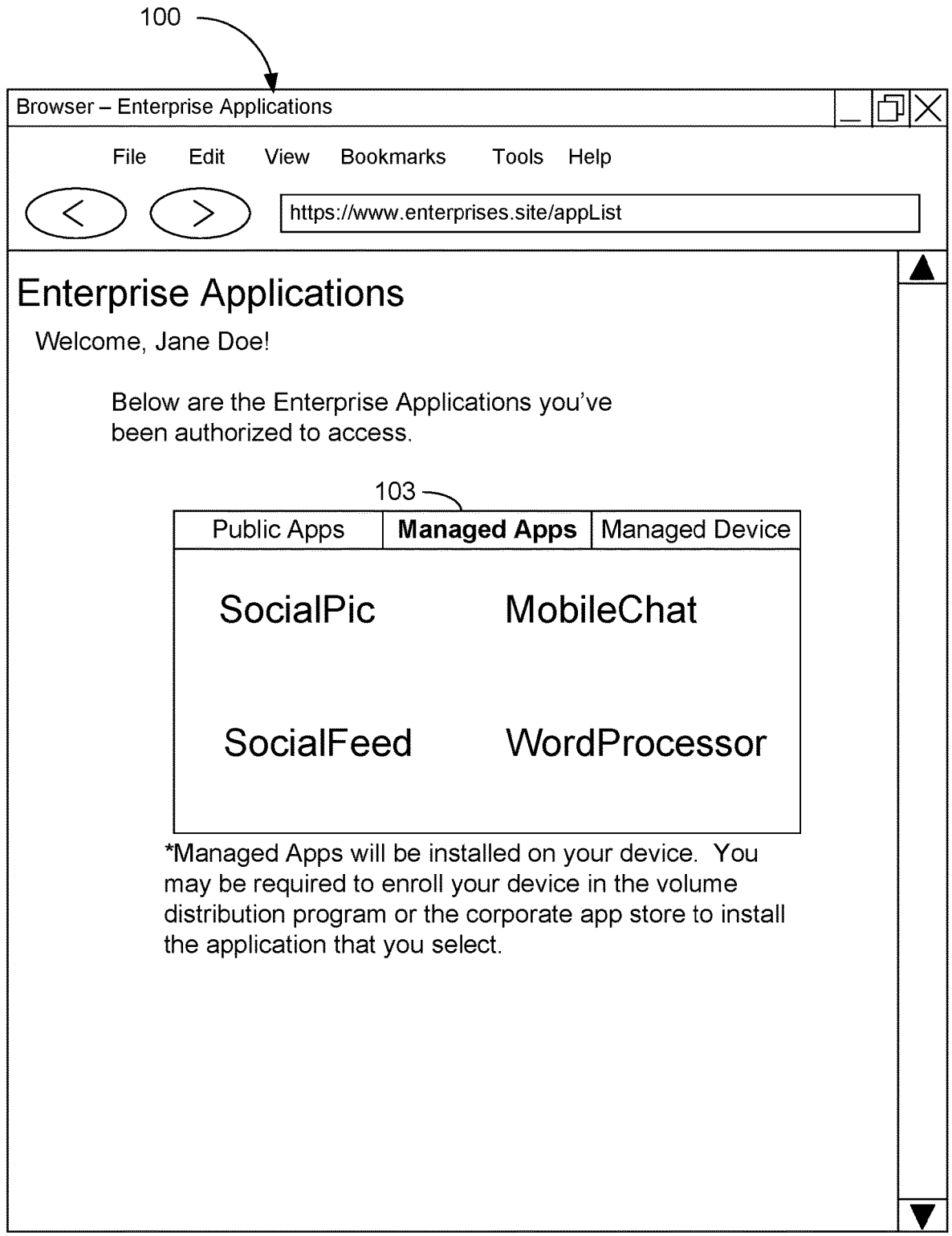
Figure 3:
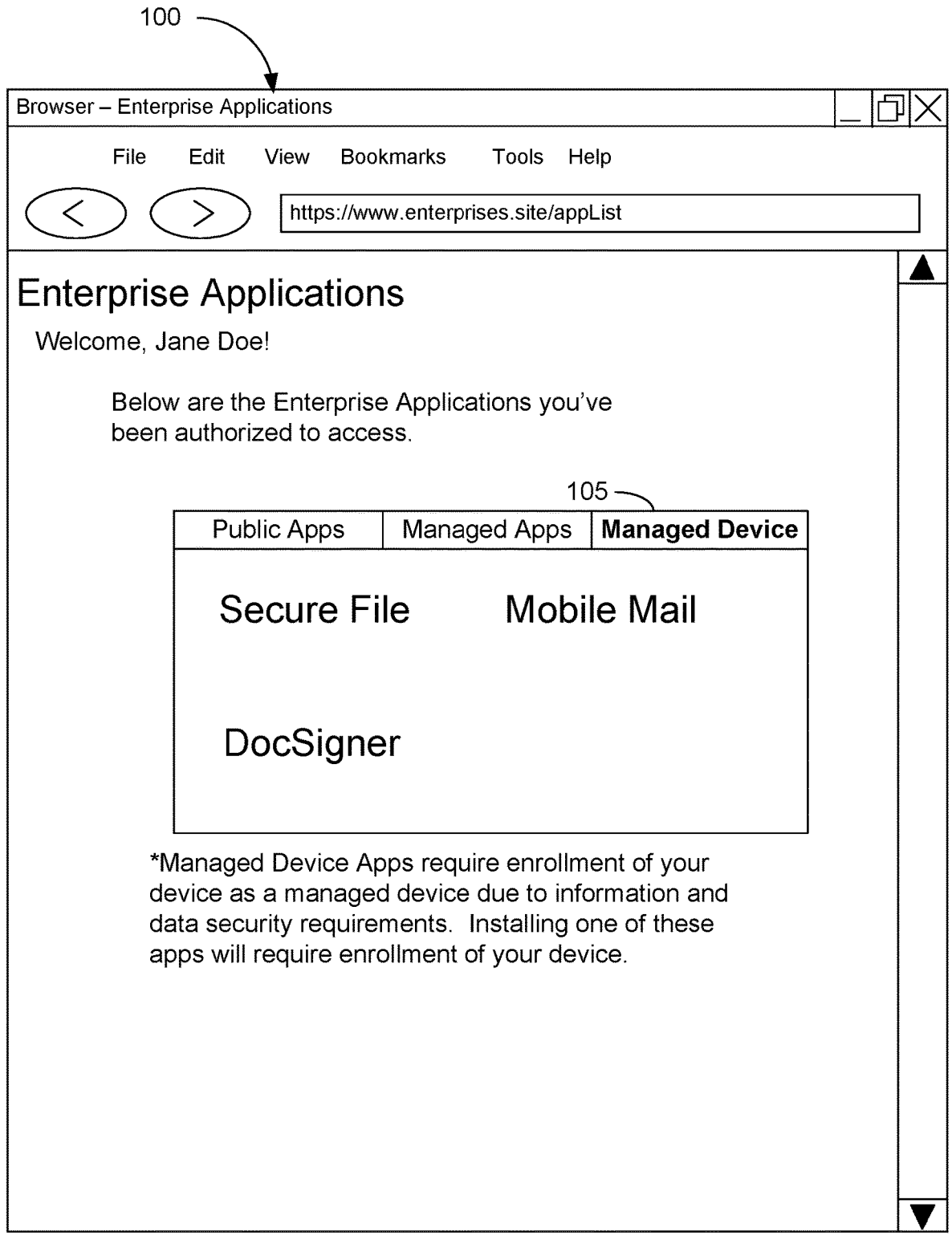

To illustrate, reference is made to FIGS. 1-3, which depict an example user interface 100 that can be generated by a management service according to examples of this disclosure. A management service can be executed by a computing environment associated with an enterprise. The management service can authenticate credentials of a user account, such as a username and password pair. The management service can then determine which applications the user is entitled to access and generate a user interface 100 that provides information about the applications. In the user interface 100 shown in FIG. 1, there are three classes of applications that require different enrollment levels. The different enrollment levels are associated with varying levels of administrative control over a client device that is required by an enterprise in exchange for providing access to a particular application.

One class of applications includes applications that are browser accessible or that do not require any additional management of the user's client device. They are denoted in the user interface 100 as "Public Apps" and by element 101. These applications are associated with an enrollment level that does not require management of a client device, enrollment of the client device with a management service, a volume licensing program, a private application repository, or any other form of enrollment.

Continuing the example of FIG. 1, reference is now made to FIG. 2. FIG. 2 illustrates another class of applications that can be provided by an enterprise to its users. In other words, the applications shown in FIG. 2 can be linked with a different enrollment level. As shown in FIG. 2 and denoted by element 103, "Managed Apps" can include applications that incorporate some level of management functionality but do not require enrollment of the device as a managed application with a management service or EMM system. This enrollment level is also known as a mobile application management (MAM) enrollment level, as the application incorporates some level of application or device management. These applications are downloaded and installed onto the client device from a publication application repository, such as a retail site that distributes or sells software. These applications can also be obtained from a private application repository that is private to the enterprise. In some scenarios, a "Managed App" can require that the client device be registered or enrolled with a volume licensing program associated with the public application repository so that a license for the application is associated with the client device.

Continuing the example of FIG. 2, reference is now made to FIG. 3. FIG. 3 illustrates another class of applications. In other words, the applications shown in FIG. 3 can be linked with yet another enrollment level. As shown in FIG. 3 and denoted by element 105, "Managed Device" applications can include certain enterprise applications that require the client device to be enrolled with a management service of the enterprise as a managed device. This enrollment level is also known as a mobile device management (MDM) enrollment level, as the device is required to become a managed device in order to access the application. Enrollment of the device as a managed device can be identified as a prerequisite for (1) installing the applications on the client device of a user in view of information and data security requirements of the enterprise or (2) accessing certain applications, such as web-based applications. As described in further detail herein, examples of this disclosure can facilitate on-demand enrollment of a client device with an appropriate enrollment level based upon an application that is selected by a user associated with the client device.

Figure 4:
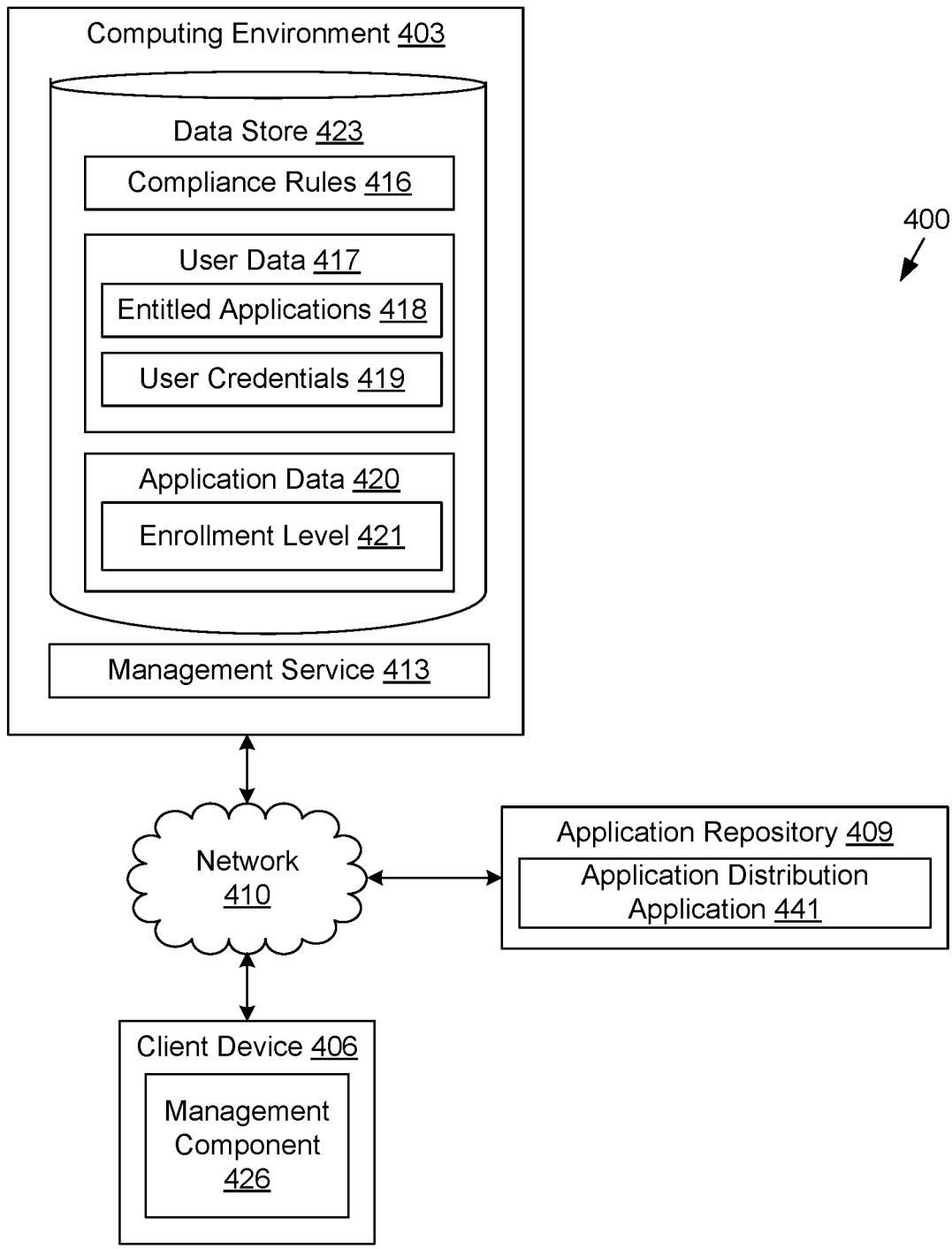
FIG. 4 is a drawing of an example of a networked environment.

With reference to FIG. 4, shown is an example of a networked environment 400. The networked environment 400 can include a computing environment 403 and a client device 406 in data communication through a network 410. The network 410 can include the Internet, one or more intranets, extranets, wide area networks (WANs), local area networks (LANs), wired networks, wireless networks, or any combination of two or more such networks. The network 410 can include satellite networks, cable networks, Ethernet networks, cellular networks, and telephony networks.

The computing environment 403 can be a computing environment operated by one or more enterprises, such as businesses or other organizations. The computing environment 403 can include a computing device, such as a server computer, that can provide computing capabilities. Alternatively, the computing environment 403 can include multiple computing devices arranged in one or more server banks or computer banks. For examples in which the computing environment 403 includes multiple computing devices, the computing devices can be located in a single installation, or the computing devices can be distributed among multiple different geographical locations.

In some examples, the computing environment 403 can include computing devices that together form a hosted computing resource or a grid computing resource. In other examples, the computing environment 403 can operate as an elastic computing resource for which the allotted capacity of computing-related resources, such as processing resources, network resources, and storage resources, can vary over time. In other examples, the computing environment 403 can include or be operated as one or more virtualized computer instances that can be executed in order to perform the functionality that is described herein.

The computing environment 403 can include various systems. For example, the computing environment 403 can include a management service 413 that can monitor and manage the operation of certain client devices 406 associated with the enterprise that operates the computing environment 403. In some examples, the management service 413 can manage and oversee the operation of multiple client devices 406 enrolled in an EMM system or service that is provided by the management service 413. The management service 413 can also provide the client devices 406 with access to email, calendar data, contact information, and other resources associated with the enterprise.

The management service 413 can assign various compliance rules 416 to respective client devices 406. The compliance rules 416 can specify, for example, one or more conditions that must be satisfied for a respective client device 406 to be deemed compliant with the compliance rule. In one example, a compliance rule 416 can specify that particular applications are prohibited from being installed in a client device 406. In another example, a compliance rule 416 can specify that a lock screen is required to be generated when the client device 406 is "awoken" from a low power "sleep" state and that a passcode is required for a user to unlock the lock screen. Some compliance rules 416 can be based on time, geographical location, or network properties. For instance, a client device 406 can satisfy a compliance rule 416 when the client device 406 is located within a particular geographic location.

A client device 406 can satisfy a compliance rule 416 in another example when the client device 406 is in communication with a particular network 410, such as a particular local area network that is managed by the computing environment 403. Furthermore, a compliance rule 416 in another example can be satisfied upon the time and date matching specified values.

Another example of a compliance rule 416 involves determining whether a user belongs to a particular group of authorized users. A compliance rule 416 can include a whitelist or a blacklist that specifies whether particular users or groups of users are authorized users. In various examples, the computing environment 403, the client device 406, or a combination of both the computing environment 403 and the client device 406 can determine whether a client device 406 satisfies a compliance rule 416.

In some examples, an enterprise can operate the management service 413 to ensure that the client devices 406 of its users satisfy respective compliance rules 416. By ensuring that the client devices 406 of its users are operating in compliance with the compliance rules 416, the enterprise can control access to resources to thereby improve the security of these devices. Compliance with compliance rules 416 can also be specified as prerequisites in order for a user to access or use a particular application that is provided or monitored by the management service 413. For example, should a client device 406 fall out of compliance with a particular compliance rule 416, the management service 413 can remove a particular application from a list of applications that the client device 406 is entitled to access or install. Additionally, other remedial actions can be taken if a client device 406 falls out of compliance with a particular compliance rule 416, such as disabling functionality of the client device 406, erasing at least a portion of data from the client device 406, notifying the user of his or her non-compliance, or notifying an administrator of the non-compliance of the client device 406.

The computing environment 403 can also include a data store 423. The data store 423 is representative of multiple data stores 423 that components in the computing environment 403 can access. The data store 423 can store various data associated with the computing environment 403. For example, the data store 423 can store the compliance rules 416 that the management service 413 has assigned to the respective client devices 406. The data store 423 can also store user data 417 and application data 420. User data 417 can include files, documents, email data, calendar data, or any other enterprise data associated with users that is accessible using a client device 406. For example, files and documents can be synchronized with a client device 406 of a user and the user data 417 stored in the data store 423.

User data 417 can include data regarding entitled applications 418 and user credentials 419. Entitled applications 418 identify those applications associated with the enterprise to which the user is authorized to access. As noted above, an application can include a browser based application, such as a web-based mail application, a web-based time entry application, or any other browser-based application. An application can also include applications that are downloaded from an application repository and installed on a client device 406 of the user. Applications can also be associated with a particular user account based upon group memberships. Group memberships represent user groups to which a particular user or user account is assigned. Applications of the enterprise can be made available to users based upon their membership in a particular user group. For example, an executive user group can have a set of applications associated with their user accounts that varies from a sales user group. In some scenarios, a user account can have additional applications associated with the account other than those that are associated with a particular user group.

User data 417 can also include information about user credentials 419 associated with the user account. User credentials 419 can include a username and password pair, multi-factor authentication data, an authentication token, or any other information with which a user can be authenticated by the management service 413.

Application data 420 can include data about enterprise applications that an enterprise can provide to its users. Application data 420 can include licensing data, or data about licenses for applications that can be distributed to a client device 406 of a user of the enterprise. Application data 420 can also identify how an application can be accessed by a user. For example, in the case of a browser-based application, the application data 420 can include a hyperlink or other information with which a browser executed by the client device 406 can access the browser-based application. In the case of an application that is installed on a client device 406, the application data 420 can identify an application repository from which the application can be obtained.

Additionally, for each application, application data 420 can further include an enrollment level 421. The enrollment level 421 represents a degree of management over a client device 406 that is required by the enterprise before access to the application is granted. In some scenarios, the enrollment level 421 can indicate that no management over the client device 406 is required in order for a user to access an application.

In another scenario, the enrollment level 421 for an application can indicate that the client device 406 must be enrolled in a volume licensing program associated with a public application repository to access an application. As another example, an enrollment level 421 can require that the user provide an acknowledgement that the application includes management functionality that includes some level of monitoring of the user's activity within the application. For instance, management functionality that monitors and ensures compliance with compliance rules 416 can be embedded in an application using application wrapping techniques. In one example, the application is wrapped with a library enforcing management policies. In another scenario, an application can be created using a software development kit (SDK) that a developer of an application can use to insert or introduce security libraries and other management functionality into the application.

Another example includes a requirement that a client device 406 be enrolled as a managed device with the management service 413 to access a particular application. The client device 406 can be enrolled as a managed device with the management service 413 through APIs provided by the operating system executed by the client device 406. The enrollment process can include authentication of a user's credentials by the management service 413. Upon authentication of a user's credentials by the management service 413, the management service 413 can transmit a management profile to the client device 406. The management profile allows use of the management APIs provided by the operating system to perform various management functions by registering or enrolling the management service 413 as an administrator of the client device 406. Upon enrollment as a managed device, the client device 406 can be remotely monitored and managed by the management service 413 to ensure compliance with compliance rules 416. Examples of management functions can include commands to erase certain data or applications from the client device 406, install certain applications or application updates, install configuration profiles, lock a client device 406 or activate a display lock feature, perform a factory reset of the client device 406, push notifications to the user of the client device 406, or perform other management functions.

The client device 406 is representative of multiple client devices 406 that can be coupled to the network 410. The client device 406 can include a processor-based computer system, such as a desktop computer, a laptop computer, a personal digital assistant, a mobile phone, or a tablet computer. The client device 406 can include output devices, such as a display and audio speakers, as well as one or more input devices, such as a mouse, keyboard, touch pad, or touch screen, which can facilitate a user interacting with and controlling the client device 406.

The client device 406 can also execute a management component 426. The management component 426 can monitor and manage data, software components, and hardware components associated with the client device 406. The management component 426 can also identify whether the client device 406 is operating in accordance with one or more compliance rules 416 that the management service 413 has assigned to the client device 406. The management component 426 can also communicate with the management service 413, as will be described in further detail below.

In one example, the management component 426 can be a portion of an operating system for the client device 406. In another example, the management component 426 can operate in the application layer of the client device 406. For instance, the management component 426 can operate as a dedicated application that can monitor and manage data, software components, and hardware components associated with the client device 406, such as an "agent" application.

The application repository 409 can include, for example, a server computer or any other system providing computing capability. Alternatively, the application repository 409 can employ multiple computing devices that may be arranged, for example, in one or more server banks, computer banks, or other arrangements. These computing devices may be located in a single installation or may be distributed among many different geographical locations.

The application repository 409 can include a public application repository or a private application repository of the enterprise. The application repository 409 can distribute copies of applications to client devices 406 for installation on client devices 406 if the application repository 409 determines that the client device 406 is authorized to download a particular application. The application repository 409 can execute an application distribution application 441 that can communicate with the management service 413 and client device 406 to facilitate examples of the disclosure.

The application distribution application 441 can facilitate a marketplace that can be accessed through an application that is installed on a client device 406 of a user, such as a pre-installed application store client that is installed on a smartphone, tablet device, or other computing device. The application distribution application 441 can store various data related to the distribution and/or sale of applications and other software through an electronic retail presence.

The application distribution application 441 can issue digital application licenses for applications that can be downloaded from the application repository 409. The licenses can be issued directly to a client device 406 or issued to the management service 413, which can then issue a license to a client device 406 that is a managed device. For example, digital application licenses can be obtained on volume licensing terms from the application repository 409 and then assigned by an enterprise to its users as the enterprise sees fit. In one scenario, a digital application license can be assigned to users based upon a user group to which the user is assigned or based on any other criteria that can be specified on behalf of the enterprise.

In this example, licenses for an application can be issued to a client device 406 by the management service 413 if the client device 406 is an unmanaged device that has been enrolled to receive applications under a volume licensing plan that the enterprise may have in place with the application repository 409. The management service 413 can also initiate installation of applications from the application repository 409 on a client device 406 that is enrolled as a managed device with the management service 413.

Next, examples of the operation of the management service 413 are described with reference to the drawings. As discussed above in the example of FIGS. 1-3, the management service 413 can generate a user interface 100 that can be displayed on a client device 406 or any other device to a user upon authenticating authentication credentials of the user. The user interface 100 can represent a self-service portal associated with the management service 413 where a user can view or modify user account data and access applications provided by an enterprise to the user. The user interface 100 can also represent an application portal from which the user can access enterprise applications.

Upon selecting an application to which the user is entitled to access, the management service 413 can determine whether the user has access to the application as well as identify an enrollment level associated with the application. If the client device 406 associated with the user meets the appropriate enrollment level, the management service 413 can provide access to the application. For example, in the case of browser-based applications where no device enrollment is required, the management service 413 can forward a browser connection associated with a particular browser session in which the user interface 100 is rendered to the browser-based application. In the case of applications that are downloaded and installed on the client device 406, the management service 413 can initiate installation of the application if the client device 406 meets the enrollment level associated with the application. If the client device 406 fails to meet the enrollment level, the management service 413 can initiate enrollment of the client device 406 before initiating installation of an application requested by the user.

Figure 5:
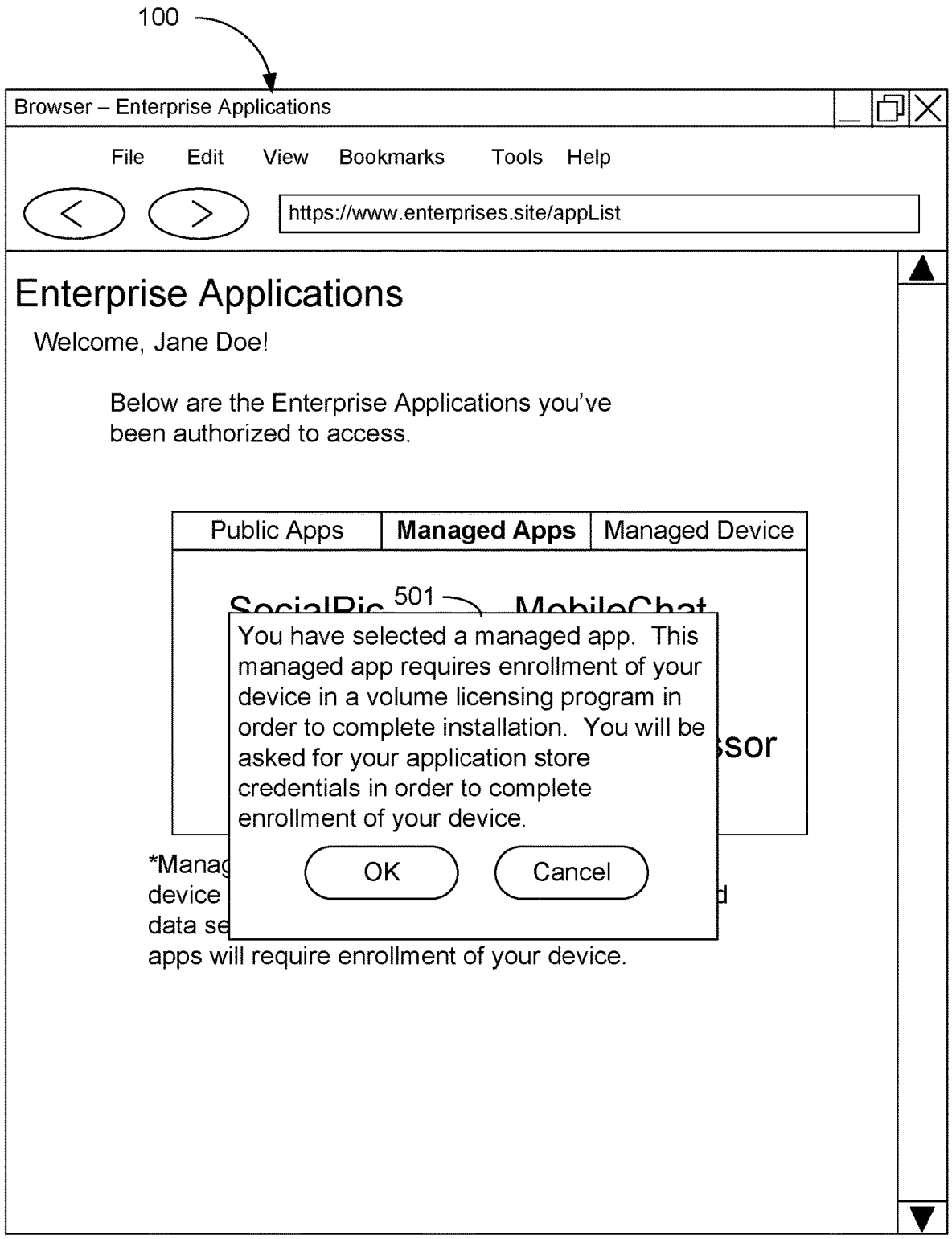
FIGS. 5 and 6 are drawings of example user interfaces.

Continuing the example of FIGS. 1-3, reference is now made to FIG. 5, which shows a user interface 100 that can be generated by the management service 113. As shown in FIG. 5, the user has selected an application that is a managed application that does not require enrollment of the user's client device 406 as a managed device. However, the enrollment level of the application requires the user enroll the client device 406 with a volume licensing program associated with the application repository 409. Enrollment of this type can be a prerequisite for installing the application so the management service 413 can assign a digital application license to the client device 406.

The management service 413 can generate and render a notice 501 that provides information about the requirements of an enrollment level associated with the application selected by the user. Upon completion of enrollment of the client device 406, the management service 413 can initiate installation of the application on the client device 406 from the application repository 409.

In one scenario, the user can enroll the client device 406 with the volume licensing program of the application repository 409 by following a link provided by the management service 413. To complete the enrollment, the user's credentials associated with the application repository 409 can be required by the application repository 409. In another scenario, a configuration or management profile can be transmitted to the client device 406 by the management service, which, if accepted by the user, can initiate enrollment of the client device 406 with the volume licensing program. In another scenario, the application selected by the user can require enrollment of the client device 406 with a private application repository 409, such as one that is maintained by the enterprise. In this scenario, the management service 413 can redirect the client device 406 to a link associated with the private application repository 409, where the user can enroll the client device 406 to access applications from the private repository.

In another scenario, an enrollment level associated with the application might not require enrollment of the client device 406 with a volume purchasing program, a private application repository, or any other type of enrollment. However, the enrollment level can require that the user be provided with a notice 501 that the application selected by the user includes management functionality that is embedded within the application through an SDK, an application wrapping framework, or that the application monitors usage of the client device 406 in some way.

Figure 6:
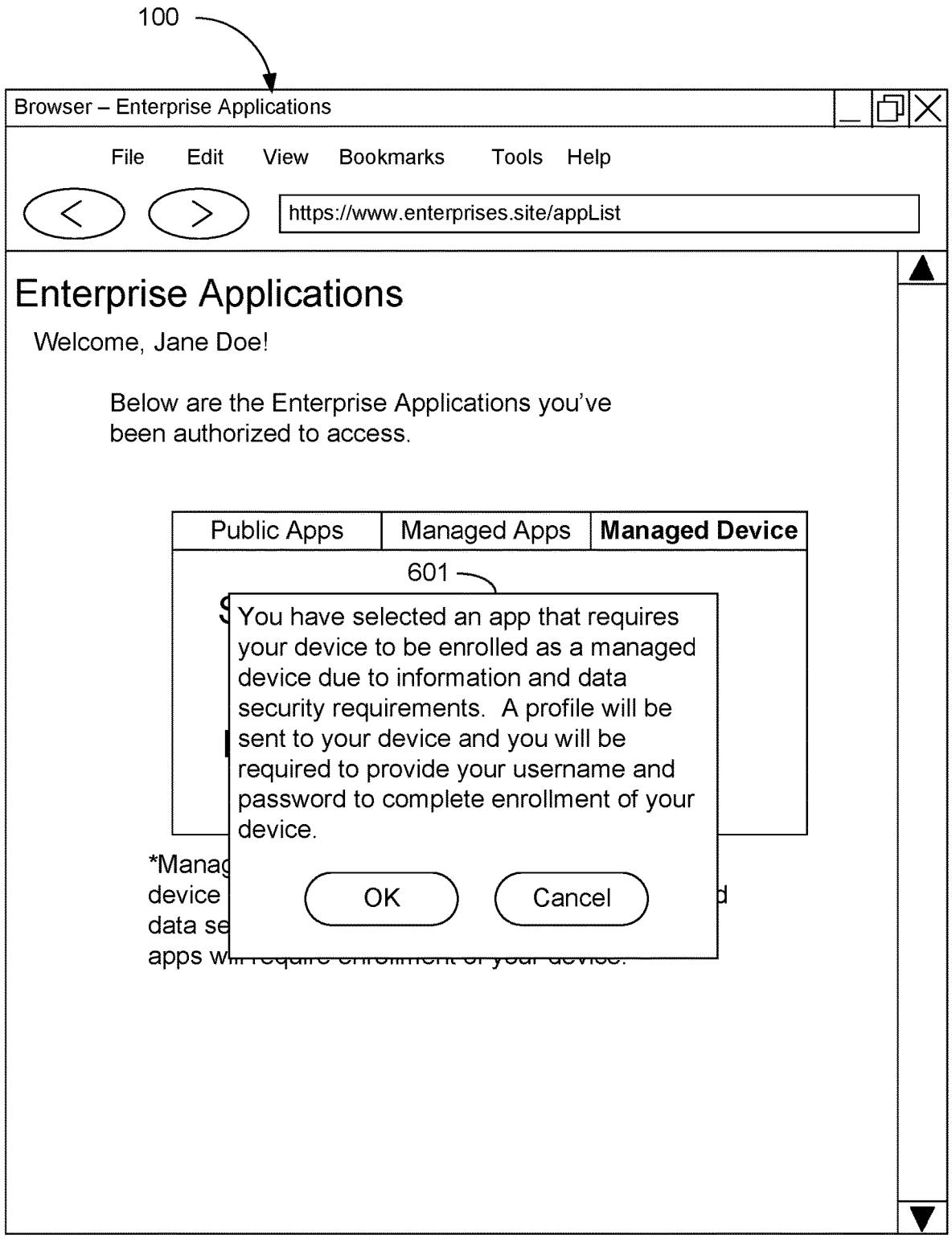

Reference is now made to FIG. 6, which illustrates an example of a user selecting an application accessible as an enterprise application that requires enrollment of the client device 406 as a managed device with the management service 413. In one example, the management service 413 can determine whether the client device 406 has already been enrolled with the management service 413. If not, then the management service 413 can generate a notice 601 in the user interface that explains that the application is associated with an enrollment level that requires the client device 406 of the user to be enrolled with the management service 413 as a managed device. For example, information and data security requirements of the enterprise may require that a client device 406 be enrolled as a managed device in order to access or install certain applications. In one scenario, the enterprise can require compliance with various compliance rules 416 for a client device 406 to install or run certain enterprise applications.

The management service 413 can initiate enrollment of the client device 406 as a managed device. If enrollment of the client device 406 is completed, the management service 413 can initiate installation of the application selected by the user. Alternatively, in the case of browser-based applications, the management service 413 can provide access to the application. To facilitate enrollment of the client device 406, the management service 413 can transmit a management or configuration profile to the client device 406. The profile can identify the management service 413 as well as various device-level policies that the operating system or the management component 426 can enforce on the client device 406. The management or configuration profile, when installed, can prompt the user for his or her user credentials 419 as a part of the enrollment process. The user credentials 419 are transmitted to the management service 413, which can authenticate the user credentials 419 and initiate completion of the enrollment process.

In this way, the management service 413 can facilitate on-demand enrollment of a client device 406 according to an enrollment level based upon an application that is selected by the user. Accordingly, a user can be required to submit the client device 406 to varying levels of device management only if the user desires to use or install certain applications. Additionally, information can be provided to the user so that the user can understand why and how the client device 406 will be managed by the management service 413 or by managed applications installed on the client device 406.

The management service 413 can facilitate other types or classes of enrollment levels that can be linked with particular applications. As an additional example, in order to facilitate enrollment of a client device 406 according to a particular enrollment level, the management service 413 can transmit a request to the client device 406 that requests user acceptance of one or more terms associated with enrollment of the client device 406 according to the enrollment level. As another example, an enrollment level of an application can require that the management service 413 transmit a request to install a particular management profile on the client device 406. The enrollment level can also require that the management profile be installed by the user on the client device 406 as a prerequisite for installing a particular application.

In another example, the management service 413 can transmit a request for user acceptance of enrollment of the client device 406 in a volume licensing program associated with an application repository 409. Another example of an enrollment level associated with an application can include a requirement that network traffic of an application travel through a virtual private network (VPN) connection. In one example, to facilitate enrollment of the device according to this enrollment level, the management service 413 can transmit a request to install a VPN profile on the client device 406 that causes network traffic associated with the application to be sent through a VPN tunnel associated with a VPN connection associated with the VPN profile.

Another example of an enrollment level 421 associated with an application can include a requirement that the client device 406 be configured with a particular configuration profile that specifies one or more configuration options for WiFi capabilities of the client device 406, a password complexity policy associated with the client device 406 or a user account of the user, a personal identification (PIN) policy associated with the device that requires the user to provide a PIN in order to unlock a display of the client device 406, or installation of an identity certificate in a certificate profile. To facilitate enrollment of the device according to these enrollment levels, the management service 413 can transmit a request to install a configuration profile on the client device 406 that specifies configuration settings associated with the device. The configuration profile can include a WiFi profile, a password complexity policy, a display lock policy requiring a PIN to access the device, or a certificate profile that includes the identity certificate. In some examples, an enrollment level 421 can require the management service 413 to obtain confirmation of successful installation of a configuration profile by the client device 406 before providing access to a selected application.

In some examples, an enrollment level 421 can require multi-factor authentication of a user before initiating enrollment of a client device 406 to provide access to a selected application. For example, the management service 413 can perform a biometric authentication of a user through a fingerprint scanner on the client device 406, a retinal scanner, voice authentication, or any other biometric authentication that can be facilitated by an input device of the client device 406. As another example, the management service 413 can perform two factor authentication that requires a user to provide an authentication code in addition to a password that is verified by the management service 413. In one example, an authentication code that can be sent to the client device 406 embedded in a short message service (SMS) message or to another application executed by the client device 406. The user can be required to provide the authentication code to the management service 413 in addition to the user's password in order to complete the multi-factor authentication and be granted access to a selected application.

In another example, an enrollment level can require that the client device 406 present a key in order to access an application through the management service 413 or through an application repository 409. A key in this scenario can include a token, certificate, decryption key, or any other authentication credential. To facilitate enrollment of the device according to an enrollment level such as this, the management service 413 can transmit the key to the client device 406, which can present the key in order to access the application. In one scenario, the key can be installed on the client device 406 through a configuration profile that includes an identity certificate that is generated by or on behalf of the management service 413. The management service 413, to authenticate a user's access to an application, can issue a challenge that causes an operating system of the client device 406 to present the identity certificate to the management service 413.

Figure 7:
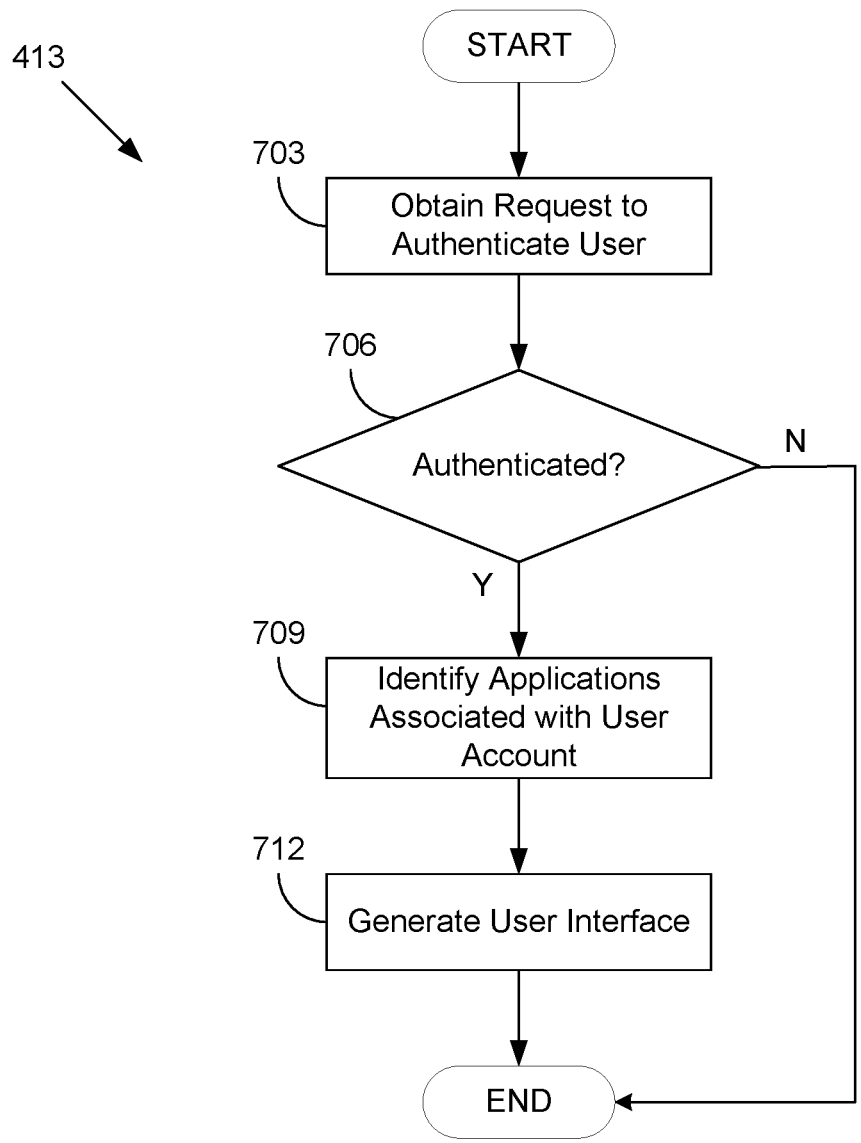
FIGS. 7-9 are flowcharts illustrating examples of functionality implemented by a management service in a computing environment.

With reference to FIG. 7, shown is a flowchart that provides an example of a portion of the operation of the management service 413. In particular, FIG. 5 provides an example of the management service 413 generating the user interface 100 depicted in FIGS. 1-3 and 5-6. The user interface 100 can be a browser-based user interface or a user interface that is generated by an application executed by the client device 406 and populated with content as directed by the management service 413. The flowchart of FIG. 7 can be viewed as depicting an example of a method implemented in the computing environment 403.

Beginning with step 703, the management service 413 can obtain a request to authenticate a user. The request to authenticate the user can originate from a user interface 100 in which a user enters authentication credentials 419. At step 706, the management service 413 can determine whether the user can be authenticated based upon the request. If the user cannot be authenticated, the process can proceed to completion. In some scenarios, an error can be presented in the user interface 100 indicating that the user could not be authenticated or that the user can initiate another attempt to authenticate his or her user credentials 419.

If the user is authenticated at step 706, the process proceeds to step 709, where the management service 413 identifies the applications that are associated with the user account data 417 of the user account. At step 712, the management service can generate the user interface 100.

Figure 8:
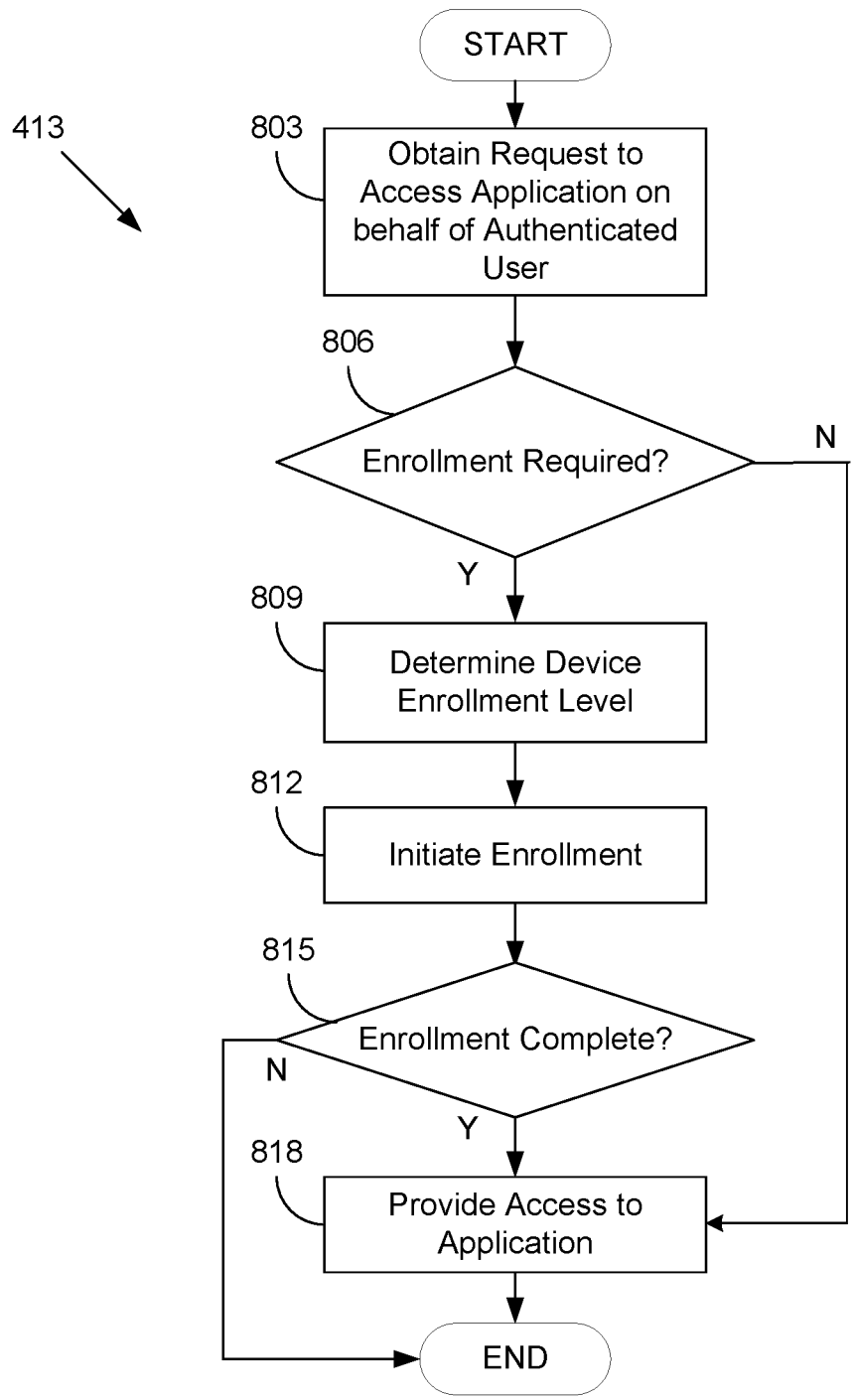

With reference to FIG. 8, shown is a flowchart that provides another example of a portion of the operation of the management service 413. In particular, FIG. 8 provides an example of the management service 413 identifying an enrollment level associated with an application selected by a user and initiating enrollment of a device according to the enrollment level. The flowchart of FIG. 8 can be viewed as depicting an example of a method implemented in the computing environment 403.

Beginning with step 803, the management service 413 can obtain a request to access an application on behalf of a user authenticated by the management service 413. The request can originate from a user interface 100 in which applications to which the user is entitled are presented. At step 806, the management service 413 can determine whether an enrollment of the client device 406 associated with the request is required based upon an enrollment level associated with the application. An enrollment level can cause presentation of a notice to the user within the user interface or completion of an enrollment of the client device 406. If no enrollment is required by the requested application, the process proceeds to step 818, where the management service 413 provides access to the requested application. Providing access to the application can take the form of the management service 413 initiating installation of the application on the client device 406, providing access to a link associated with a browser based application, providing access to a key that can unlock access to an application, or establishing a data connection for an application to a remote data source or service.

If an enrollment of the client device 406 is required according to the enrollment level, the process proceeds from step 806 to step 809, where the management service 413 determines an enrollment level associated with the application. At step 812, the management service 413 can initiate enrollment of the client device 406 according to the enrollment level. At step 815, the management service 413 can determine whether the specified enrollment has been completed by the client device 406. If so, then at step 818, the management service 413 provides access to the requested application. If not, the process proceeds to completion.

Figure 9:
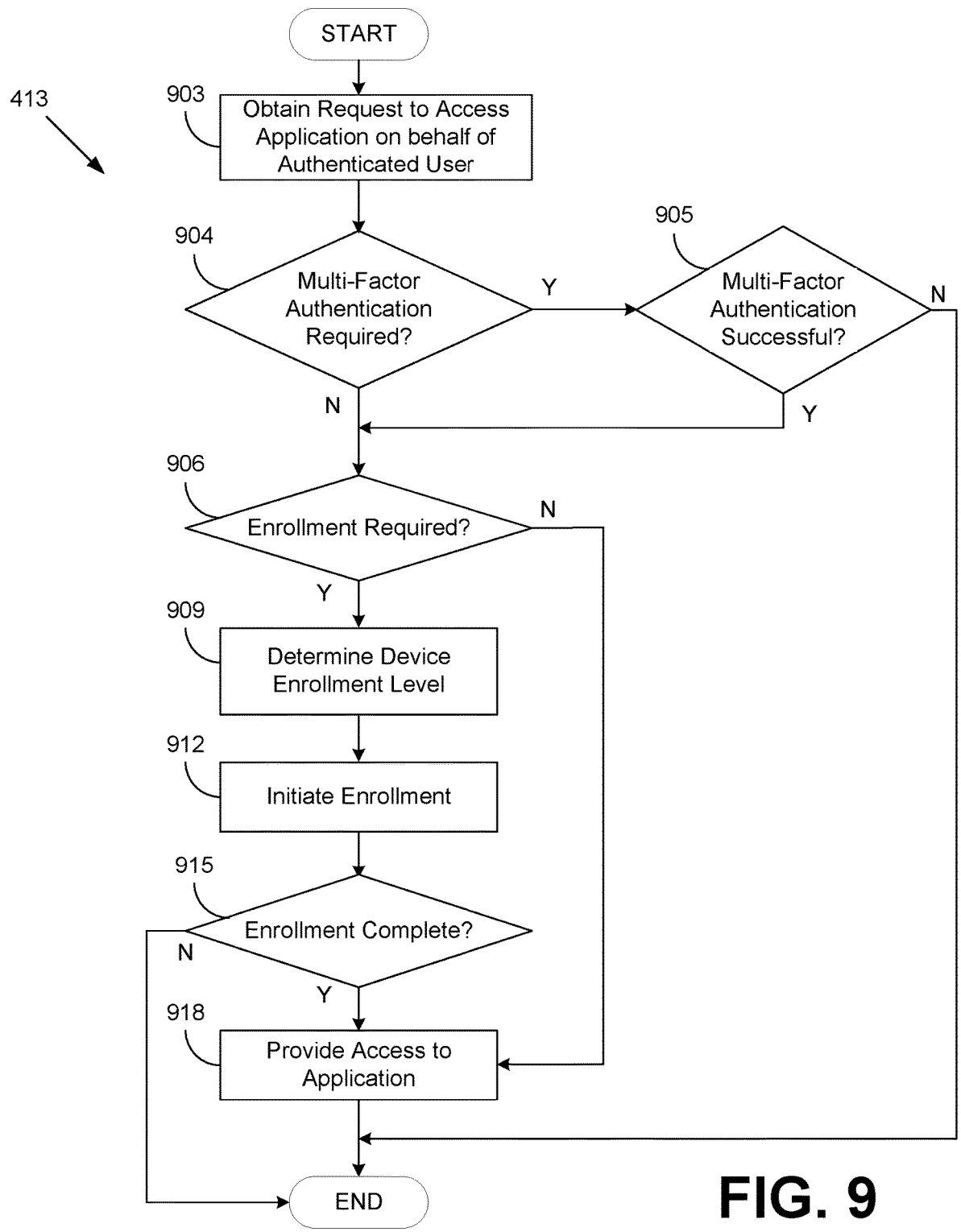

With reference to FIG. 9, shown is a flowchart that provides another example of a portion of the operation of the management service 413. In particular, FIG. 9 provides an example of the management service 413 identifying an enrollment level associated with an application selected by a user and initiating enrollment of a device according to the enrollment level. The flowchart of FIG. 9 can be viewed as depicting an example of a method implemented in the computing environment 403.

Beginning with step 903, the management service 413 can obtain a request to access an application on behalf of a user. The request can originate from a user interface 100 in which applications to which the user is entitled is presented. At step 904, the management service 413 can determine whether an enrollment level 421 associated with the application selected by the user requires multi-factor authentication. If the enrollment level 421 for the requested application does not require multi-factor authentication of the user, the process can proceed to step 906. If the requested application requires multi-factor authentication, the management service 413 can initiate multi-factor authentication as specified by the enrollment level 421 at step 905. If multi-factor authentication of the user fails, then the process can proceed to completion. If multi-factor authentication of the user is successful, the process can proceed to step 906.

At step 906, the management service 413 can determine whether an enrollment of the client device 406 associated with the request is required based upon an enrollment level 421 associated with the application. An enrollment level 421 can cause presentation of a notice to the user within the user interface or completion of an enrollment of the client device 406. If no enrollment is required by the requested application, the process proceeds to step 918, where the management service 413 provides access to the requested application. Providing access to the application can take the form of the management service 413 initiating installation of the application on the client device 406, providing access to a link associated with a browser based application, providing access to a key that can unlock access to an application, or establishing a data connection for an application to a remote data source or service.

If an enrollment of the client device 406 is required according to the enrollment level, the process proceeds from step 906 to step 909, where the management service 413 determines an enrollment level associated with the application. At step 912, the management service 413 can initiate enrollment of the client device 406 according to the enrollment level. At step 915, the management service 413 can determine whether the specified enrollment has been completed by the client device 406. If so, then at step 918, the management service 413 provides access to the requested application. If not, the process proceeds to completion.

The flowcharts of FIGS. 7-9 show examples of the functionality and operation of implementations of components described herein. The components of the networked environment 400 described herein can be embodied in hardware, software, or a combination of hardware and software. If embodied in software, each step in the flowcharts of FIGS. 7-9 can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The computing environment 403 and client device 406 can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, portions of the management service 413, and the management component 426 can be stored in one or more storage devices and be executable by one or more processors. Also, the data store 423 can be located in the one or more storage devices.

The management service 413 and the management component 426 can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

The invention claimed is:

1. A method for providing access to an application on a client device, comprising:
   receiving, from the client device, a request to access an application;
   determining an enrollment level associated with the application, wherein the enrollment level indicates a level of administrative control over the client device for access to the application, wherein the level of administrative control comprises one of a plurality of levels by a management service that remotely manages the client device;
   causing the client device to install a management component on the client device in response to the enrollment level indicating the installation of the application requires a specified degree of control over the client device, wherein the management component initiates enrollment of the client device as a managed device with the management service;
   determining that multi-factor authentication is required for access to the application on the client device based on the enrollment level associated with the application; and
   initiating multi-factor authentication on the client device.

2. The method of claim 1, further comprising:
   transmitting a request to the client device for an acceptance of an enrollment notice, wherein:
   the enrollment notice is displayed on the client device; and
   the enrollment notice specifies that authorization to access the application is based on enrolling the client device as a managed device with a management service.

3. The method of claim 1, further comprising:
   determining that multi-factor authentication is successful on the client device;
   transmitting a management component to the client device; and
   installing the management component on the client device for enrollment of the client device as a managed device with a management service.

4. The method of claim 3, further comprising providing access to the application on the client device after installation of the management component.

5. The method of claim 3, further comprising:
   receiving a user credential upon installation of the management component;
   authenticating the user credential; and
   completing enrollment of the client device with a management service.

6. The method of claim 1, further comprising transmitting a request to enroll the client device with a volume licensing program associated with an application repository.

7. A system for providing access to an application on a client device, comprising:
   at least one computing device; and
   a memory device comprising computer-readable instructions stored thereon, the computer-readable instructions, when executed by the at least one computing device, directing the at least one computing device to at least:

receive a request to access an application from the client device;

determine an enrollment level associated with the application, wherein the enrollment level indicates a level of administrative control over the client device for access to the application, wherein the level of administrative control comprises one of a plurality of levels by a management service that remotely manages the client device;

cause the client device to install a management component on the client device in response to the enrollment level indicating the installation of the application requires a specified degree of control over the client device, wherein the management component initiates enrollment of the client device as a managed device with the management service;

determine that multi-factor authentication is required for access to the application on the client device based on the enrollment level associated with the application; and initiate multi-factor authentication on the client device.

8. The system of claim 7, wherein:

the computer-readable instructions further direct the at least one computing device to at least transmit a request to the client device for an acceptance of an enrollment notice;

the enrollment notice is displayed on the client device; and the enrollment notice specifies that authorization to access the application is based on enrolling the client device as a managed device with a management service.

9. The system of claim 7, wherein the computer-readable instructions further direct the at least one computing device to at least:

determine that multi-factor authentication is successful on the client device;

transmit a management component to the client device; and install the management component on the client device for enrollment of the client device as a managed device with a management service.

10. The system of claim 9, wherein the computer-readable instructions further direct the at least one computing device to at least provide access to the application on the client device after installation of the management component.

11. The system of claim 9, wherein the computer-readable instructions further direct the at least one computing device to at least:

receive a user credential upon installation of the management component;

authenticate the user credential; and complete enrollment of the client device with a management service.

12. The system of claim 7, wherein the computer-readable instructions further direct the at least one computing device to at least transmit a request to enroll the client device with a volume licensing program associated with an application repository.

13. A non-transitory computer-readable medium embodying computer-readable instructions thereon for providing access to an application on a client device that, when executed by at least one computing device, direct the at least one computing device to at least:

receive a request to access an application from the client device;

determine an enrollment level associated with the application, wherein the enrollment level indicates a level of administrative control over the client device for access to the application in response to the enrollment level indicating the installation of the application requires a specified degree of control over the client device, wherein the level of administrative control comprises one of a plurality of levels by a management service that remotely manages the client device;

cause the client device to install a management component on the client device, wherein the management component initiates enrollment of the client device as a managed device with the management service;

determine that multi-factor authentication is required for access to the application on the client device based on the enrollment level associated with the application; and initiate multi-factor authentication on the client device.

14. The non-transitory computer-readable medium of claim 13, wherein:

the computer-readable instructions further direct the at least one computing device to at least transmit a request to the client device for an acceptance of an enrollment notice;

the enrollment notice is displayed on the client device; and the enrollment notice specifies that authorization to access the application is based on enrolling the client device as a managed device with a management service.

15. The non-transitory computer-readable medium of claim 13, wherein the computer-readable instructions further direct the at least one computing device to at least:

determine that multi-factor authentication is successful on the client device;

transmit a management component to the client device; and install the management component on the client device for enrollment of the client device as a managed device with a management service.

16. The non-transitory computer-readable medium of claim 15, wherein the computer-readable instructions further direct the at least one computing device to at least:

receive a user credential upon installation of the management component;

authenticate the user credential; and complete enrollment of the client device with a management service.

17. The non-transitory computer-readable medium of claim 13, wherein the computer-readable instructions further direct the at least one computing device to at least transmit a request to enroll the client device with a volume licensing program associated with an application repository.

* * * * *